United States Patent Office 3,219,690
Patented Nov. 23, 1965

3,219,690
ARYLSULFUR PENTAFLUORIDES AND THEIR PREPARATION
William A. Sheppard, Wilmington, Del., assignor to E. I. du Pont de Nemours and Company, Wilmington, Del., a corporation of Delaware
No Drawing. Filed Mar. 16, 1959, Ser. No. 799,468
11 Claims. (Cl. 260—515)

This invention relates to new organic compositions containing fluorine. More particularly, it is directed to certain organosulfur pentafluorides and to their preparation.

Organic fluorine-containing compounds have achieved technical importance because the compounds possess unusual and unexpected physical and chemical properties. The preparation and properties of compounds which contain fluorine-carbon bonds have been studied extensively but relatively little attention has been given to organic compounds which contain fluorine bonded to an element other than carbon.

In particular, organic compounds which contain fluorine bonded to sulfur have received only limited attention and little information is available on the properties of these compounds. Perfluoroalkylsulfur trifluorides and perfluoroalkylsulfur pentafluorides are reported to be obtained in low yields by electrolytic processes which employ fluorine and hydrogen fluoride. These compounds are saturated open chain products which are composed of fluorine, carbon and sulfur. The compounds obtained in the electrolytic processes usually contain no hydrogen. A dinitrophenylsulfur trifluoride, that is, a compound in which the sulfur is tetravalent, has been reported.

There is no information, however, on the preparation and properties of arylsulfur pentafluorides, that is, compounds which have an —$SF_5$ group bonded to a nuclear carbon of an aromatic ring. Arylsulfur pentafluorides, as a class, have heretofore been unknown.

My invention provides for a select class of such sulfur pentafluorides, namely, those which contain a hexavalent sulfur atom which is bonded to five fluorine atoms and to a nuclear carbon of an aromatic group, any additional substituents on the aromatic group being halogen or groups which are joined to a nuclear carbon through carbon, oxygen or sulfur.

The compounds of my invention can be represented by the formula $$X_nR(SF_5)_m$$

wherein R is an aromatic group, X is a halogen or a substituent bonded to a nuclear carbon through carbon, oxygen, or sulfur; m is a positive whole number of at most 3, that is, m is 1, 2, or 3, and n is a cardinal number of at most 5, that is, n is 0, 1, 2, 3, 4, or 5. When n=0, X is the hydrogen originally present on the aromatic group, that is, except for the $SF_5$ substituent, the aromatic group is unsubstituted. Thus, X can be halogen (–F, –Cl, –Br, or –I), hydroxyl (–OH), thiol (–SH), hydrocrabyl (alkyl, cycloalkyl, alkenyl, aryl, alkaryl), halohydrocarbyl, oxahyldrocarbyl (HOR'–, R'O–, ROR''–), thiahydrocarbyl (R'S– and R'–S''–), hydrocarbonyl

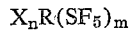
(R'—C—)

hydrocarbonyloxy

(R'—C—O—)

carboxy

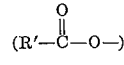
(—C—OH)

or groups hydrolyzable to carboxy (esters, amides, acid halides and cyano), and sulfo (–$SO_3H$) or groups hydrolyzable to a sulfo group (sulfonamides, sulfonic esters and sulfonyl halides, e.g., fluorides, chlorides and bromides). In the above formulas R' and R'' are organic groups which are preferably, although not necessarily, hydrocarbon. The substituent X will be illustrated further in subsequent paragraphs.

The aromatic group, R, can be composed of fused or separate aromatic rings. The sulfur pentafluoride group (–$SF_5$) and any additional substituents. if present, can be bonded to carbons in the same aromatic ring or to carbons in different aromatic rings. Preferably the number of ring or nuclear carbons in the aromatic group it at most 24; m is a cardinal number of at most 2, that is, m is 1 or 2; and n is an integer of at most 2, that is, n is 0, 1 or 2.

The following examples are illustrative of the new compounds of the invention: phenylsulfur pentafluoride, 2-biphenylsulfur pentafluoride, 4,4'-biphenylenebis(sulfur pentafluoride), 4,4''-(p-terphenylene)bis(sulfur pentafluoride), 2-naphthylsulfur pentafluoride, 2.5-naphthenylenebis(sulfur pentafluoride), 1-anthrylsulfur pentafluoride, 9,10 - anthrylenebis(sulfur pentafluoride), m-chlorophenylsulfur pentafluoride, p-iodophenylsulfur pentafluoride, pentachlorophenylsulfur pentafluoride, pentafluorophenylsulfur pentafluoride, 2-hydroxy-1-naphthylsulfur pentafluoride, 2-mercapto-1-naphthylsulfur pentafluoride, 1,3,5-trimethylphenylsulfur pentafluoride, p-dodecylphenylsulfur pentafluoride, p-allylphenylsulfur pentafluoride, m-cyclohexylphenylsulfur pentafluoride, p-(trichloromethyl)phenysulfur pentafluoride, o-(2-bromoethyl)phenylsulfur pentafluoride, p-phenoxyphenylsulfur pentafluoride, p-methoxyphenylsulfur pentafluoride, 8-dodecyloxy-1-naphthylsulfur pentafluoride, p-(2-methoxyethyl)phenylsulfur pentafluoride, o-(butylthio)phenylsulfur pentafluoride, m-(phenylthiomethyl)phenylsulfur pentafluoride, p-acetylphenylsulfur pentafluoride, o-propionylphenylsulfur pentafluoride, p-(propionyloxy)phenylsulfur pentafluoride, m - (stearoyloxy)phenylsulfur pentafluoride, 8-carboxy-2-anthrylsulfur pentafluoride, o-methoxycarbonylphenylsulfur pentafluoride, p-(N-phenylcarbamyl)phenylsulfur pentafluoride, o-(chlorocarbonyl)phenylsulfur pentafluoride, m-cyanophenylsulfur pentafluoride, 8-sulfo-1-naphthylsulfur pentafluoride, p-chlorosulfonylphenylsulfur pentafluoride, and 4'-(N,N-diethylsulfonamido)-4-biphenylsulfur pentafluoride. Additional examples which illustrate the compounds of the invention are 1,3,5-benzenetris(sulfur pentafluoride), 2,4,6-(p-quaterphenyl)tris(sulfur pentafluoride), pentacenesulfur pentafluoride, p-acetylphenylsulfur pentafluoride, 8-propionyl-1-naphthylsulfur pentafluoride, 4'-benzoyl-4-biphenylsulfur pentafluoride, and the like.

A preferred group of compounds are the arylsulfur pentafluorides in which any substituents, if present in addition to sulfur pentafluoride groups, are halogen, hydroxyl, alkyl, alkylene, hydroxyalkyl or carboxyl groups or groups hydrolyzable to carboxyl groups.

The compounds of the invention are characterized by excellent thermal and chemical stability. They are generally colorless liquids or crystalline solids which can be stored in conventional containers under normal atmospheric conditions. They can generally be distilled under reduced pressure and are soluble without reaction in many organic liquids, for example, ethyl ether, acetone, ethanol, benzene, dioxane, ethyl acetate, dimethyl formamide, and the like.

The compounds of the present invention are obtained by several procedures. One method of broad applicability consists in reacting silver difluoride at a temperature of at least 115° C. with an aromatic polysulfide in which the sulfur is present as disulfide (—S—S—) groups bonded to nuclear carbons of the aromatic groups.

Optionally an aromatic sulfur trifluoride can be reacted with silver difluoride at a temperature of at least 115° C. to obtain the compounds of the invention. The aromatic sulfur trifluorides are represented by the formula $X_nR(SF_3)_m$, where R, X, $m$ and $n$ have the meanings given in the preceding paragraphs which describe my novel compounds. Although the mechanism of the reaction is not clearly understood it is believed to occur in two steps as illustrated by the following equation in which an aromatic reactant with one disulfide group is used.

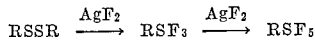

$$RSSR \xrightarrow{AgF_2} RSF_3 \xrightarrow{AgF_2} RSF_5$$

It is evident from this equation that an arylsulfur trifluoride can be employed as the starting reactant in place of the disulfide and the use of an arylsulfur trifluoride, therefore, represents a modification of the broad process employing a disulfide.

The above method of preparation, starting with either the disulfide or the sulfur trifluoride is broadly applicable for preparing the new compounds of the invention or for preparing intermediate compounds containing the sulfur pentafluoride group from which the compounds of the invention are obtained by conventional and well-known methods for introducing substituents on the aromatic nucleus. For example, an arylsulfur pentafluoride can be nitrated, sulfonated or halogenated by conventional organic procedures to produce substituted arylsulfur pentafluorides which can be further modified, for example, by reduction, hydrolysis or carbonylation procedures to yield arylsulfur pentafluorides bearing amino, hydroxyl or carboxy substituents.

In the process which employs an aryl disulfide as a starting reactant for preparing an arylsulfur pentafluoride, a mixture of the disulfide and silver difluoride is preferably, although not necessarily, heated in a suitable solvent for a short period at a temperature which is generally below 100° C. The solvent is then preferably removed and the reaction mixture, which contains principally the sulfur trifluoride at this stage, is heated for an additional period to 115–150° C. The reaction product is then purified by conventional procedures, for example, by distillation through an efficient fractionating column, by crystallization, by chromatographic procedures and the like.

For the initial heating periods the preferred temperature range is 40–75° C.; for the second heating period the preferred temperature range is 125–135° C. The time of heating in each step is not critical and will generally be from 0.5–24 hours.

Silver difluoride is preferably used in excess although the proportions in which the reactants are used are not critical. In general, the molar ratio of the silver difluoride to the disulfide will lie between about 5:1 and 30:1; the preferred ratio lies between about 10:1 and 20:1.

The solvent employed should obviously be unreactive to silver difluoride. The preferred solvents are fully halogenated hydrocarbons in which the halogens are chlorine or fluorine and which boil above 30° C. and below 100° C. However, solvents which boil above 100° C. are operable and can be employed. Removal of the solvent while heating the reactants to 115° C. or higher is solely a matter of convenience and is not essential for operability of the process. The entire reaction can be conducted in a solvent if desired and the reaction can be heated to 115° C. or higher without an intervening low temperature heating period. It is essential that a final reaction temperature of at least 115° C. be employed.

Optionally, the mixture of aryl disulfide and silver difluoride can be heated in the absence of a solvent in one step to 115° C. or higher, if desired. This procedure is operable and the desired arylsulfur pentafluorides are obtained, although yields of the arylsulfur pentafluorides are generally lower than yields obtained by a process which employs a solvent.

The reaction is preferably conducted under substantially anhydrous conditions in a vessel whose inner surfaces are resistant to attack by hydrogen fluoride and silver difluoride, for example, poly(tetrafluoroethylene) resin, platinum, copper, etc. Silver difluoride and the disulfides employed in the process are available as commercial preparations or are obtained by conventional procedures described in the literature. The reactants need not be especially purified prior to use.

The following examples, in which the proportions of the reactants are given as parts by weight, illustrate the methods of preparing the arylsulfur pentafluorides of the invention.

*Example 1*

A. A mixture of 8.0 parts of phenylsulfur trifluoride and 18 parts of silver difluoride is charged into a reaction vessel (capacity, 30 parts of water) which is made of poly(tetrafluoroethylene) resin. The reaction vessel is equipped with a stirrer and with a condenser of poly (tetrafluoroethylene) resin which is connected by copper tubing to a trap cooled with a solid carbon dioxide-acetone solution. The reaction mixture is heated with stirring for 1 hour at 115–130° C. The pressure on the vessel is then reduced gradually to 5 mm. and the product which distills is collected in the chilled trap. The product is washed with water and is then dissolved in ether. The ether solution is washed with aqueous 5% sodium hydroxide solution, dried over anhydrous magnesium sulfate, filtered and the ether removed by evaporation. The liquid residue is distilled under reduced pressure to yield 1.4 parts of phenylsulfur pentafluoride ($C_6H_5$—$SF_5$), a clear, colorless liquid which boils at 67–69.5° C. at 40 mm.

B. A mixture of 350 parts of silver difluoride and about 155 parts of trichlorotrifluoroethane ("Freon" 113) is placed in a copper reaction vessel (capacity, 1000 parts of water) which is equipped with a stainless steel stirrer, a dropping funnel and a condenser made of poly(tetrafloroethylene) resin. A solution of 40 parts of diphenyl disulfide in about 390 parts of trichlorotrifluoroethane is added dropwise to the reaction mixture which is stirred vigorously. When addition is completed, the reaction mass containing phenylsulfur trifluoride and unreacted silver difluoride is heated at 50–60° C. to remove all of the trichlorotrifluoroethane through the condenser. The liquid residue is then heated to 120–130° C. for 2 hours. A trap cooled with a solid carbon dioxide-acetone solution is connected to the condenser and to a vacuum pump. The pressure on the reaction vessel is gradually reduced to 10 mm. The product which distills into the trap is purified as described in Part A.

There is obtained 6.5 parts of phenylsulfur pentafluoride which is further purified by vapor phase chromatography, employing a column (6 ft. x 0.5 in.) packed with silicon oil on firebrick and heated at 130° C. Phenylsulfur pentafluoride boils at 148.6° C.; $n_D^{27}$, 1.4251; density, about 1.4. The identity of the compound is confirmed by nuclear magnetic resonance, infrared and ultraviolet spectra and by elementary analysis.

*Analysis.*—Calc'd for $C_6H_5SF_5$: C, 35.3; H, 2.47; S, 15.70; F, 46.5. Found: C, 35.9; H, 2.78; S, 15.57; F, 46.7.

Phenylsulfur pentafluoride is soluble in ethyl ether, benzene and pentane; it is insoluble in water.

Other compounds which are prepared by the process of Example I are 1,3,5-trimethylphenylsulfur pentafluoride from bis(1,3,5-trimethylphenyl)disulfide, 1-naphthylsulfur pentafluoride from bis(1-naphthyl)disulfide, 5-cyclohexyl-1,3-phenylenebis(sulfur pentafluoride) from 5-cyclohexyl-1,3-phenylenebis(sulfur trifluoride), and p-octadecylphenylsulfur pentafluoride from bis(p-octadecylphenyl)-disulfide.

Example II

A copper reaction vessel (capacity, 1000 parts of water) which is equipped with a condenser made of poly(tetrafluoroethylene) resin and a stainless steel stirrer is charged with 42 parts of bis(m-nitrophenyl)-disulfide, 250 parts of silver difluoride and about 312 parts of trichlorotrifluoroethane ("Freon" 113). The mixture is heated at reflux temperature (about 47° C.) for about 20 hours. The solvent is removed by distillation and the liquid residue is heated to 120° C. for 2–3 hours and to 135° C. for 2–4 hours. The reaction mixture is cooled and extracted successively with five portions of warm chloroform (about 300 parts each). The combined extracts are reduced to 250–300 parts by evaporation of the chloroform. The liquid residue is washed with dilute sodium hydroxide solution (about 5%) until free of acid and the liquid is then distilled through an efficient fractionating column. There is obtained 21.6 parts (31.6% yield) of m-nitrophenylsulfur pentafluoride, B.P. 85.5° C./2.65 mm.; $n_D^{25}$, 1.4732.

*Analysis.*—Calc'd for $C_6H_4NO_2SF_5$: C, 28.9; H, 1.62; N, 5.63; S, 12.9; F, 38.1. Found: C, 29.7; H, 1.92; N, 5.23; S, 12.6; F, 38.5.

A Parr hydrogenation apparatus is employed in the second step of this preparation of 3-biphenylsulfur pentafluoride. A pressure vessel (capacity, 500 parts of water) is charged with about 8.3 parts of m-nitrophenylsulfur pentafluoride, 78 parts of ethanol, approximately 5.5 parts of a 5.5 N solution of hydrogen chloride in ethanol and 0.3 parts of platinum oxide catalyst. The charged reaction vessel is flushed with hydrogen, pressured to 40 lbs. with hydrogen and shaken for approximately 30 minutes. The reaction vessel is then charged with 0.2 part of fresh platinum oxide and again shaken under hydrogen at 40 lbs. pressure for 60 minutes. The reaction mixture is filtered and the ethanol removed by evaporation at room temperature under an atmosphere of nitrogen. The solid product which remains is triturated with about 75 parts of ethyl ether, the ether is removed by filtration and the solid is washed thoroughly with ether. There is obtained 8.5 parts of the hydrochloride of m-aminophenylsulfur pentafluoride as a fine white powder.

*Analysis.*—Calc'd for $C_6H_7NSF_5Cl$: C, 28.2; H, 2.76; N, 5.48; S, 12.6; F, 37.2; Cl, 13.9; M.W., 255.6. Found: C, 28.5; H, 3.16; N, 5.45; S, 12.9; F, 37.4; Cl, 14.3; M.W., 257.0.

A solution of 4.5 parts of sodium nitrite in 7 parts of water is added dropwise to a cooled (about 5° C.) and stirred solution of 5.5 parts of the hydrochloride of m-aminophenylsulfur pentafluoride in 9.5 parts of concentrated hydrochloric acid and 5 parts of water. After addition is complete, 60 parts of benzene, cooled to 4° C., are added with stirring to the solution. Vigorous agitation is continued while about 15 parts of an aqueous 5 N solution of sodium hydroxide (cooled to 4–5° C.) is added dropwise to the mixture which is cooled to 5° C. or less. The mixture is agitated for about 30 minutes after addition is completed and the temperature is allowed to rise to about 25° C. The reaction mixture is acidified with hydrochloric acid and the benzene layer separated by conventional methods. The aqueous layer is extracted twice with benzene. The combined benzene extracts are washed with 10% aqueous sodium hydroxide solution and water, dried over anhydrous magnesium sulfate, filtered and distilled through an efficient fractionating column. There is obtained 4.5 parts of 3-biphenylsulfur pentafluoride, boiling at 112–113.5° C. at 2 mm.; M.P. 20.5–21.5° C.; $n_D^{25}$, 1.532. The identity of the compound, which has the structure

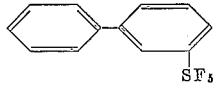

is confirmed by nuclear magnetic resonance, infrared and ultraviolet spectra and by elementary analysis.

*Analysis.*—Calc'd for $C_{12}H_9SF_5$: C, 51.4; H, 3.24; F, 33.9. Found: C, 51.1; H, 3.27; F, 33.4.

The process illustrated in Example II can be applied equally well to the preparation of monocyclic arylsulfur pentafluorides. For example, phenylsulfur pentafluoride is prepared by diazotization of p-aminophenylsulfur pentafluoride and reaction with phosphorous acid. m-Phenylenebis(sulfur pentafluoride) is obtained by a similar process from 5-amino-1,3-phenylenebis(sulfur pentafluoride).

Arylsulfur pentafluorides prepared as described in Examples I and II can be employed to prepare a broad range of substituted arylsulfur pentafluorides. For example, m-sulfophenylsulfur pentafluoride $(HO_3SC_6H_4SF_5)$ is obtained by reaction of phensulfur pentafluoride with fuming sulfuric acid; m-chlorosulfonylphenylsulfur pentafluoride is obtained by reaction of the sulfonic acid with phosphorus pentachloride and m-fluorosulfonylphenylsulfur pentafluoride is obtained by treatment of the chlorosulfonyl compound with potassium fluoride. Esters of sulfoarylsulfur pentafluorides are obtained by reaction of the chlorosulfonyl compound with the appropriate alcohol, e.g., p-chlorosulfonylphenylsulfur pentafluoride when reacted with cyclohexanol forms the cyclohexyl ester of p-sulfophenylsulfur pentafluoride. Sulfonamides are obtained by reacting the chlorosulfonylarylsulfur pentafluorides with an amine, for example, p-(N, N-dibutylsulfonamido) phenylsulfur pentafluoride is obtained from p-chlorosulfophenylsulfur pentafluoride and dibutylamine.

Example III

A solution of 7.6 parts of sodium nitrite in 10 parts of water, cooled to about 5° C., is added dropwise and with vigorous stirring to a cooled solution containing 25.4 parts of the hydrochloride of p-aminophenylsulfur pentafluoride, 60 parts of concentrated hydrochloric acid and 25 parts of ice and water. One-half of this solution (which contains the diazonium chloride) is cooled to 0° C. and added carefully to a cooled (0° C.) solution containing 9.6 parts of copper sulfate, 5 parts of sodium chloride, 2.5 parts of sodium bisulfite, 25 parts of water and 10.8 parts of concentrated hydrochloric acid. The reaction mixture is stirred for about 3 hours and allowed to warm to 25° C. It is then heated to 60° C. and steam distilled. The distillate is purified as described in Example II, and 4.86 parts of p-chlorophenylsulfur pentafluoride is obtained which boils at 77° C. at 17 mm.; $n_D^{25}$, 1.4550. The structure of the product is confirmed by the nuclear magnetic resonance, infrared and ultraviolet spectra and by elementary analysis.

*Analysis.*—Calc'd for $C_6H_4ClSF_5$: C, 30.2; H, 1.69; Cl, 14.86. Found: C, 30.7; H, 1.91; Cl, 14.83.

Using the procedure of Example III, m-chlorophenylsulfur pentafluoride is obtained from the hydrochloride of m-aminophenylsulfur pentafluoride.

Example IV

A. Approximately 300 parts of aqueous 10% sodium carbonate solution is added to 15.3 parts of the hydrochloride of m-aminophenylsulfur pentafluoride. The reaction mixture is stirred for a few minutes and is then extracted several times with ethyl ether. The ether solution is dried over anhydrous magnesium sulfate, filtered and the ether removed by distillation. The liquid residue, which is the free m-aminophenylsulfur pentafluoride is dissolved in 27 parts of 48% hydrogen bromide and the solution is cooled to 0–5° C. A solution of 4.2 parts of sodium nitrite in 8 parts of water is added while maintaining the temperature at 5° C. or less. This solution is then added dropwise and with vigorous stirring to a boiling solution of 4.6 parts of cuprous bromide in 8.2 parts of 48% hydrogen bromide. The reaction mixture is steam distilled, the distillate is extracted with ether and the ether extract dried over anhydrous magnesium sulfate. The ether solution is filtered and distilled through an efficient fractionating column. There is obtained 1.6 parts of m-bromophenylsulfur pentafluoride, boiling at 71.5–72.5° C. at 9.0 mm.; $n_D^{24}$, 1.4782. The identity of the compound is confirmed by infrared, ultraviolet and nuclear magnetic resonance spectra and by elementary analysis.

*Analysis.*—Calc'd for $C_6H_4SF_5Br$: C, 25.5; H, 1.42; S, 11.33; F, 33.6; Br, 28.2. Found: C, 25.7; H, 1.68; S, 11.26; F, 33.8; Br, 28.0.

B. The procedure of Part A is repeated using 15.3 parts of the hydrochloride of p-aminophenylsulfur pentafluoride. The reactants otherwise are the same as described in Part A. There is obtained 8.4 parts of p-bromophenylsulfur pentafluoride which boils at 77.2° C. at 10 mm.; $n_D^{26}$, 1.4776. The identity of the compound is confirmed by infrared, ultraviolet and nuclear magnetic resonance spectra and by elementary analysis.

*Analysis.*—Calc'd for $C_6H_4SF_5Br$: C, 25.5; H, 1.42. Found: C, 25.9; H, 1.63.

The procedure of Examples III and IV can be applied broadly to the preparation of halogen-substituted arylsulfur pentafluorides. For example, 5-chloro-1-naphthylsulfur pentafluoride is obtained from 5-amino-1-napthylsulfur pentafluoride, 8-bromo-1-naphthylsulfur pentafluoride from 8-amino-1-naphthylsulfur pentafluoride and 4′-bromo-4-biphenylsulfur pentafluoride is obtained from 4′-amino-4-biphenylsulfur pentafluoride. Fluoroarylsulfur pentafluorides, e.g., m- and p-fluorophenylsulfur pentafluorides, are preferably obtained by recation of fluoroaryl disulfides with silver difluorides as described in Example I.

The procedure of Examples III and IV, modified by employing cuprous cyanide in place of cuprous chloride or cuprous bromide, is used to prepare cyano-substituted arylsulfur pentafluorides. For example, m-cyanophenylsulfur pentafluoride is obtained from m-aminophenylsulfur pentafluoride and 4′-cyano-4-biphenylsulfur pentafluoride is obtained from 4′-amino-4-biphenylsulfur pentafluoride.

*Example V*

A. Approximately 200 parts of aqueous 10% sodium bicarbonate solution is added to 19.2 parts of the hydrochloride of p-aminophenylsulfur pentafluoride. The reaction mixture is stirred for a few minutes and is then extracted several times with ethyl ether. The ether solution is dried over anhydrous magnesium sulfate, filtered and the ether removed by distillation. The liquid residue, which is the free aminophenylsulfur pentafluoride, is treated in a conventional manner with a cold solution of 5.2 parts of sodium nitrite, 16 parts of concentrated sulfuric acid and 12 parts of water to form the diazonium salt. The solution of the diazonium salt is then added dropwise to a boiling solution of 37 parts of water and 92 parts of concentrated sulfuric acid. The reaction mixture is steam distilled and the crude p-hydroyphenylsulfur pentafluoride extracted with ether from the distillate. After removal of the ether, the product is sublimed and then crystallized from hexane containing 2–3% of benzene. There is obtained 8.24 parts of p-hydroxyphenylsulfur pentafluoride, a white crystalline solid melting at 104–105° C. The identity of the product is confirmed by nuclear magnetic resonance, infrared and ultraviolet spectra and by elementary analysis.

*Analysis.*—Calc'd for $C_6H_5OSF_5$: C, 32.73; H, 2.29; F, 43.16. Found: C, 33.05; H, 2.40; F, 43.14.

B. The experiment of Part A is repeated employing 19.2 parts of m-aminophenylsulfur pentafluoride in place of the p-aminophenylsulfur pentafluoride. There is obtained 18.7 parts of m-hydroxyphenylsulfur pentafluoride, boiling at 81.5° C. at 3 mm.; melting at 66.5° C. The identity of the product is confirmed by nuclear magnetic resonance, infrared and ultraviolet spectra and by elementary analysis.

*Analysis.*—Calc'd for $C_6H_5OSF_5$: C, 32.73; H, 2.29; F, 43.16. Found: C, 32.85; H, 2.59; F, 42.80.

The procedure of Example V is generically applicable to the preparation of hydroxy-substituted arylsulfur pentafluorides. For example, 8-hydroxy-1-anthrylsulfur pentafluoride is obtained from 8-amino-1-anthrylsulfur pentafluoride, 5-hydroxy-2-(p-terphenyl)sulfur pentafluoride is obtained from 5-amino-2-(p-terphenyl)sulfur pentafluoride and o-hydroxy-p-tolylsulfur pentafluoride is obtained from o-amino-p-tolylsulfur pentafluoride.

The hydroxy-substituted arylsulfur pentafluorides can be esterified by conventional procedures to obtain, for example, acetates, propionates, stearates, oleates, benzoate, naphthenates, and the like. To illustrate, p-hydroxyphenylsulfur pentafluoride is converted to the sodium salt by careful treatment with sodium hydroxide and the sodium salt of the phenol is then reacted with benzoyl chloride to obtain p-benzoyloxyphenylsulfur pentafluoride.

*Example VI*

A. A reaction vessel (capacity, 100 parts of water) is employed which is equipped with an addition funnel, a stirring device, a reflux condenser, a thermometer and an exit tube protected with a drying agent (for example, anhydrous calcium sulfate). The vessel is flushed with dry nitrogen and charged with 4 parts of anhydrous ethyl ether and 1.43 parts of magnesium metal. A solution of 5.9 parts of m-bromophenylsulfur pentafluoride and 2.84 parts of methyl iodide in 20 parts of dry ethyl ether is added dropwise to the ether suspension of magnesium metal. The rate of addition is sufficient to maintain a gentle refluxing of the ether. The reaction mixture is stirred and maintained at refluxing temperature for about 40 minutes, following which it is chilled to −5 to −10° C. and connected to a source of dry carbon dioxide. The carbon dioxide is passed through the ether solution at a rate such that the temperature of the solution does not rise above about −2° C. Passage of carbon dioxide is continued until no more of the gas is absorbed. There is then added dropwise and with vigorous stirring about 15 parts of 6 N sulfuric acid to the reaction mixture.

The ether layer is separated from the aqueous layer which is extracted several times with ether. The ether extracts are combined, dried over anhydrous magnesium sulfate, filtered and the ether removed by evaporation. There is obtained, as a residue, 5.5 parts of m-carboxyphenylsulfur pentafluoride which is purified by crystallization from water containing 15% ethanol to yield a white solid melting at 140–144° C. The solid is further purified by crystallization from hexane containing a few percent benzene and by sublimation at 100–120° C. under 5 mm. pressure. The pure m-carboxyphenylsulfur pentafluoride melts at 153–155.2° C. The ionization constant ($pK_a$) of the acid in 50% aqueous ethanol is 4.82. The identity of the product is confirmed by nuclear magnetic resonance, ultraviolet and infrared spectra and by elementary analysis.

*Analysis.*—Calc'd for $C_7H_5O_2SF_5$: C, 33.9; H, 2.02; F, 38.3; M.W., 249.8. Found: C, 34.2; H, 2.17; F, 38.5; M.W., 248.2.

B. The procedure described in Part A is repeated employing 5.9 parts of p-bromophenylsulfur pentafluoride in place of m-bromophenylsulfur pentafluoride. There is obtained 1.97 parts of p-carboxyphenylsulfur pentafluoride, melting at 191.5–192.5° C. The ionization constant ($pK_a$) of the acid in 50% aqueous ethanol is 4.70. The identity of the product is confirmed by nuclear magnetic resonance, ultraviolet and infrared spectra and by elementary analysis.

*Analysis.*—Calc'd for $C_7H_5O_2SF_5$: C, 33.9; H, 2.02; F, 38.3; M.W., 249.8. Found: C, 34.2; H, 2.10; F, 38.6; M.W., 244.2.

The process of Example VI can be used to prepare a wide range of carboxy-substituted arylsulfur pentafluorides. For example, o-carboxy-p-isopropylphenylsulfur pentafluoride is obtained from o-bromo-p-isopropylphenylsulfur pentafluoride and 4-carboxy-1-naphthylsulfur pentafluoride is obtained from 4-bromo-1-naphthylsulfur pentafluoride.

The carboxy-substituted arylsulfur pentafluorides are converted to esters, amides and acyl halides by well-known methods. To illustrate, reaction of p-carboxyphenylsulfur pentafluoride with thionyl chloride yields p-(chlorocarbonyl)phenylsulfur pentafluoride. Reaction of the latter compound with an alcohol (e.g., butyl alcohol) or a metal alkoxide forms an ester, for example, p-(butoxycarbonyl)phenylsulfur pentafluoride. Reaction of p-(butoxycarbonyl)phenylsulfur pentafluoride with a primary or secondary amine (e.g., dicyclohexylamine, aniline) forms an amide, for example, p-(N,N-dicyclohexylcarbamyl)phenylsulfur pentafluoride or p-(N-phenylcarbamyl)phenylsulfur pentafluoride.

The above examples are generic to substituted arylsulfur pentafluorides in which the aryl group is polycyclic. Examples of polycyclic compounds which fall within the scope of the invention are 8-carboxy-1-naphthylsulfur pentafluoride, 5-sulfo-1-naphthylsulfur pentafluoride, 4-ethoxycarbonyl-2-naphthylsulfur pentafluoride, 4″ - (N,N-dimethylsulfamyl)-4-biphenylsulfur pentafluoride and 4″ - (N,N-dihexylcarbamyl)-1,3,5-biphenyltris-(sulfur pentafluoride).

*Example VII*

A. A reaction vessel (capacity, 100 parts of water), which is equipped as described in Part A of Example VI, is charged with 4 parts of anhydrous ethyl ether and 1.70 parts of magnesium metal. A solution of 9.5 parts of m-bromophenylsulfur pentafluoride and 4.7 parts of methyl iodide in 28 parts of anhydrous ethyl ether is added to the suspension of magnesium in ether as described in Example VI to form the Grignard reagent.

A chilled solution of 3.5 parts of acetaldehyde in 8 parts of dry ethyl ether is added slowly and with vigorous agitation to the solution of Grignard reagent which is maintained at a temperature of 0° C. or less. The reaction mixture is stirred for 1 hour and is then hydrolyzed with about 10 parts of a 25% solution of ammonium chloride in water. The ether layer is separated and the aqueous layer extracted with ether. The combined ether solutions are treated as described in Example VI and there is obtained 3.61 parts of m-(1-hydroxyethyl)phenylsulfur pentafluoride, $CH_3CH(OH)$—$C_6H_4SF_5$, a colorless liquid which boils at 85–86° C. at 1.4 mm.; $n_D^{21}$, 1.4637. The identity of the compound is confirmed by nuclear magnetic resonance, infrared and ultraviolet spectra and by elementary analysis.

*Analysis.*—Calc'd for $C_8H_9OSF_5$: C, 38.7; H, 3.66; F, 38.3. Found: C, 39.1; H, 3.81; F, 37.2.

B. Fourteen parts of m-bromophenylsulfur pentafluoride and 0.7 part of methyl iodide are reacted as described in Part A above with 1.5 parts of magnesium metal and 3.5 parts of acetaldehyde. There is obtained 1.5 parts of m-(1-hydroxyethyl)phenylsulfur pentafluoride. Approximately 8 parts of m-bromophenylsulfur pentafluoride are recovered.

Using the procedure of Example VII–A, p-(1-hydroxyethyl)phenylsulfur pentafluoride is prepared from p-bromophenylsulfur pentafluoride, methyliodide, magnesium and acetaldehyde.

The process of Example VII is useful in preparing hydroxyalkyl-substituted arylsulfur pentafluorides. For example, 5-(1-hydroxyethyl)-2-naphthylsulfur pentafluoride is prepared from 5-bromo-2-naphthylsulfur pentafluoride and acetaldehyde; 8-(1-hydroxybutyl)-1-naphthylsulfur pentafluoride is obtained from 8-bromo-1-napthylsulfur pentafluoride and n-butyraldehyde; 5-(1-hydroxypropyl)-3-biphenylsulfur pentafluoride is obtained from 5-bromo-3-biphenylsulfur pentafluoride and propionaldehyde; and 4″-(1-hydroxyethyl)-4-(m-terphenyl)sulfur pentafluoride is obtained from 4″-bromo-4-(m-terphenyl)sulfur pentafluoride and acetaldehyde.

The hydroxyalkyl-substituted arylsulfur pentafluorides are converted by conventional procedures to ethers and esters to form hydrocarbyloxyalkyl and hydrocarbonyloxyalkyl-substituted arylsulfur pentafluorides. The hydroxyalkyl-substituted arylsulfur pentafluorides are also converted by conventional methods to haloalkyl-substituted arylsulfur pentafluorides. For example, m-(1-hydroxyethyl)phenylsulfur pentafluoride is reacted with thionyl chloride to form m-(1-chloroethyl)phenylsulfur pentafluoride; 5-(1-hydroxypropyl)-3-biphenylsulfur pentafluoride is reacted with thionyl chloride to yield 5-(1-chloropropyl) - 3 - biphenylsulfur pentafluoride. Treatment of the haloalkyl compounds with, for example, sodium mercaptides, yields thioethers. For example, from the above-mentioned haloalkyl compounds there can be obtained m-[1-(methylthio)ethyl]phenylsulfur pentafluoride and 5-[1-(ethylthiopropyl]-3-biphenylsulfur pentafluoride by reaction of the halogen-substituted compounds with sodium methyl mercaptide and sodium ethyl mercaptide, respectively.

*Example VIII*

A mixture of 3.15 parts of m-(1-hydroxyethyl)phenylsulfur pentafluoride, 0.2 part of phosphorus pentoxide and 0.05 part of hydroquinone is charged into a glass reaction vessel equipped with a stirrer and an efficient fractionating column which is connected to a receiver and a vacuum pump. The mixture is heated at 130–170° C. with agitation at a pressure of 150 mm. which is gradually reduced to 50 mm. There is obtained in the receiver 2.15 parts of m-vinylphenylsulfur pentafluoride

$(CH_2=CHC_6H_4SF_5)$ which is a colorless liquid boiling at 74.5° C. at 10 mm.; $n_D^{27.5}$, 1.4693. The compound has an odor which resembles that of styrene. Its identity is confirmed by nuclear magnetic resonance, ultraviolet and infrared spectra and by elementary analysis.

*Analysis.*—Calc'd for $C_8H_7SF_5$: C, 41.7; H, 3.07; F, 41.3. Found: C, 41.8; H, 3.04; F, 41.1.

The compound of Example VIII is converted by conventional methods, for example, by warming at 90–100° C. in benzene solution with a catalytic quantity of benzoyl peroxide, to a clear polymer which is easily molded into brilliantly clear shaped objects.

Example VIII is illustrative of a process for obtaining arylsulfur pentafluorides which contain unsaturated substituents. Other compounds which are obtained by this process are p-vinylphenylsulfur pentafluoride, p-(1-butenyl)phenylsulfur pentafluoride, 4′-propenyl-4-biphenylsulfur pentafluoride and 5-(1-hexenyl)-1-naphthylsulfur pentafluoride.

The arylsulfur pentafluorides which contain unsaturated substituents as described above can be halogenated by reaction with, for example, chlorine or bromine. Thus, reaction of m-vinylphenylsulfur pentafluoride with chlorine yields m-(1,2-dichloroethyl)phenylsulfur pentafluoride, reaction with bromine forms m-(1,2-dibromoethyl)phenylsulfur pentafluoride. By a similar procedure there can be obtained p-(1,2-dichloropropyl)phenylsulfur pentafluoride, 8-(1,2-dibromobutyl) - 2 - naphthylsulfur pentafluoride and 3-(1,2-dichloroethyl)-1-biphenylsulfur pentafluoride.

The arylsulfur pentafluorides which contain unsaturated substituents can be hydrogenated to yield alkyl-substituted arylsulfur pentafluorides. For example, m-ethylphenylsulfur pentafluoride is obtained by hydrogenation of m-vinylphenylsulfur pentafluoride; p-butylphenylsulfur pentafluoride is obtained from p-(1-butenyl)phenylsulfur pentafluoride; and 4′-propyl-4-biphenylsulfur pentafluoride is obtained from 4′-propenyl-4-biphenylsulfur pentafluoride. Hydrogenation is performed by conventional methods, for example, by employing a platinum oxide catalyst in a Parr hydrogenation unit.

Arylsulfur pentafluorides which have acyl substituents are obtained by oxidation of the hydroxy-alkyl-substituted arylsulfur pentafluorides or by acylation of arylsulfur pentafluorides by conventional and well-known methods. For example, m-acetylphenylsulfur pentafluoride is obtained by oxidation of m-(1-hydroxyethyl)phenylsulfur pentafluoride with potassium permanganate; p-benzoylphenylsulfur pentafluoride is obtained by reaction (Friedel-Crafts) of benzoyl chloride with phenylsulfur pentafluoride.

The compounds of the invention, as stated earlier, possess excellent thermal stability and the sulfur pentafluoride group is resistant to hydrolysis under acidic, basic and neutral conditions. To illustrate, phenylsulfur pentafluoride can be distilled at atmospheric pressure without decomposition. Heating the compound in a sealed tube for 7 hours at 400–450° C. results in only minor decomposition. Phenylsulfur pentafluoride is recovered unchanged after 4 hours contact at 100° C. with aqueous 5% sodium hydroxide or with 0.5 N sodium hydroxide in aqeuous alcohol (50%). No fluoride ion is detected in each case.

The compounds of the invention are useful as "stable liquid" materials, e.g., fluids for high temperature power transmissions, hydraulic systems or liquid-coupled mechanical drives.

The compounds of the invention are also useful as solvents for highly fluorinated polymers, e.g., the fluorinated olefin polymers. Solutions of such polymers, e.g., poly(tetrafluoroethylene), poly(chlorotrifluoroethylene) and the like in arylsulfur pentafluorides are useful in making cellulosic compositions waterproof. To illustrate, a 10% by weight solution of a low molecular weight, low melting tetrafluoroethylene polymer (melting range 83–150° C.) is prepared by warming the polymer in phenylsulfur pentafluoride until the polymer dissolves. Strips of cellulose filter paper are partly immersed (to about half the length of the paper) in the warm solution for 0.5–1.0 minute. The strips are removed, washed thoroughly with acetone and dried in air. The treated area of the filter paper is not wet by drops of water, whereas the untreated area is immediately and completely wetted by water. The treated area of the paper does not support combustion, whereas the untreated area burns readily. Equally good results are obtained by employing approximately 10% solutions of low melting tetrafluoroethylene polymer in m-hydroxyphenylsulfur pentafluoride and in 3-biphenylsulfur pentafluoride as treating agents for cellulose strips.

The foregoing detailed description has been given for clearness of understanding only and no unnecessary limitations are to be understood therefrom. The invention is not limited to the exact details described, for obvious modifications will occur to those skilled in the art.

The embodiments of the invention in which an exclusive property or privilege is claimed are defined as follows:

1. Compounds of the formula $$X_nR(SF_5)_m$$

wherein R is an aromatic hydrocarbon group, X has a maximum of eighteen carbons and is a member of the group consisting of halogen, hydroxyl, thiol, hydrocarbyl, halohydrocarbyl, oxahydrocarbyl, thiahydrocarbyl, hydrocarbonyl, hydrocarbonyloxy, carboxy and groups hydrolyzable thereto, and sulfo and groups hydrolyzable thereto, $m$ is a whole number of 1–3, inclusive, and $n$ is a cardinal number of from zero to 5, inclusive.

2. Phenylsulfur pentafluoride.
3. 3-biphenylsulfur pentafluoride.
4. Monochlorophenylsulfur pentafluorides having the chlorine-bearing carbon separated by at least one carbon from the carbon bearing the sulfur pentafluoride group.
5. Monobromophenylsulfur pentafluorides having the bromine-bearing carbon separated by at least one carbon from the carbon bearing the sulfur pentafluoride group.
6. Monohydroxyphenylsulfur pentafluorides having the hydroxy-bearing carbon separated by at least one carbon from the carbon bearing the sulfur pentafluoride group.
7. Monocarboxyphenylsulfur pentafluorides having the carboxy-bearing carbon separated by at least one carbon from the carbon bearing the sulfur pentafluoride group.
8. Mono(1-hydroxyethyl)phenylsulfur pentafluorides having the 1-hydroxyethyl-bearing carbon separated by at least one carbon from the carbon bearing the sulfur pentafluoride group.
9. Monovinylphenylsulfur pentafluorides having the vinyl-bearing carbon separated by at least one carbon from the carbon bearing the sulfur pentafluoride group.
10. Process for preparing arylsulfur pentafluorides which comprises reacting at a temperature in the range of 115° to 150° C. silver difluoride with an aromatic sulfur trifluoride of the formula $$X_nR(SF_3)_m$$

wherein R is an aromatic hydrocarbon group, X has a maximum of eighteen carbons and is a member of the group consisting of halogen, hydroxyl, thiol, hydrocarbyl, halohydrocarbyl, oxahydrocarbyl, thiahydrocarbyl, hydrocarbonyl, hydrocarbonyloxy, carboxy and groups hydrolyzable thereto, and sulfo and groups hydrolyzable thereto, $m$ is a whole number of 1–3, inclusive, and $n$ is a cardinal number of from zero to 5, inclusive.

11. Process for preparing arylsulfur pentafluorides which comprises reacting at a temperature in the range of 115° to 150° C. silver difluoride with an aromatic sulfur trifluoride of the formula $$X_nR(SF_3)_m$$

wherein R is an aromatic hydrocarbon group, X is a hydrocarbon radical having a maximum of eighteen carbons, $m$ is a whole number of 1–3, inclusive, and $n$ is a cardinal number from 0–5, inclusive.

References Cited by the Examiner

Emeleus et al.: "Jour. Chem. Soc.," 1946 (London), pages 1126–31.

LORRAINE A. WEINBERGER, *Primary Examiner.*

LEON ZITVER, CHARLES B. PARKER, *Examiners.*

UNITED STATES PATENT OFFICE
CERTIFICATE OF CORRECTION

Patent No. 3,219,690                        November 23, 1965

William A. Sheppard

It is hereby certified that error appears in the above numbered patent requiring correction and that the said Letters Patent should read as corrected below.

Column 1, line 57, the "l" in "-Cl," and the "r" in "-Br," should not be italicized; line 58, for "hydrocrabyl" read -- hydrocarbyl --; line 59, for "oxahyldrocarbyl" read -- oxahydrocarbyl --; line 60, for "$R'-S''$ -" read -- $R'-S-R''$ --; column 3, line 30, for "halgoenated" read -- halogenated --; column 6, line 17, for "phensulfur" read -- phenylsulfur --; column 7, line 59, for "p-hydroyphenylsulfur" read -- p-hydroxyphenylsulfur --; column 10, lines 36 and 37, for "$(CH_2-CHC_6H_4SF_5)$" read -- $(CH_2=CHC_6H_4SF_5)$ --; column 11, line 24, for "aqeuous" read -- aqueous --.

Signed and sealed this 18th day of October 1966.

(SEAL)
Attest:

ERNEST W. SWIDER                      EDWARD J. BRENNER
Attesting Officer                    Commissioner of Patents